(12) United States Patent
Iddya et al.

(10) Patent No.: US 11,622,255 B2
(45) Date of Patent: Apr. 4, 2023

(54) METHODS, SYSTEMS, AND COMPUTER READABLE MEDIA FOR VALIDATING A SESSION MANAGEMENT FUNCTION (SMF) REGISTRATION REQUEST

(71) Applicant: Oracle International Corporation, Redwood Shores, CA (US)

(72) Inventors: Arjun Iddya, Udupi (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/076,482

(22) Filed: Oct. 21, 2020

(65) Prior Publication Data

US 2022/0124479 A1   Apr. 21, 2022

(51) Int. Cl.
*H04W 8/06* (2009.01)
*H04L 67/141* (2022.01)

(52) U.S. Cl.
CPC ............. *H04W 8/06* (2013.01); *H04L 67/141* (2013.01)

(58) Field of Classification Search
CPC .................... H04L 67/141; H04W 8/00–30
See application file for complete search history.

(56) References Cited

U.S. PATENT DOCUMENTS

| | | | |
|---|---|---|---|
| 6,091,958 A | 7/2000 | Bergkvist et al. | |
| 6,151,503 A | 11/2000 | Chavez | |
| 6,292,666 B1 | 9/2001 | Siddiqui et al. | |
| 6,308,075 B1 | 10/2001 | Irten et al. | |
| 6,343,215 B1 | 1/2002 | Calabrese et al. | |
| 6,591,101 B1 | 7/2003 | Shimbori | |
| 7,043,754 B2 | 5/2006 | Arnouse | |
| 7,567,661 B1 | 7/2009 | Wood et al. | |

(Continued)

FOREIGN PATENT DOCUMENTS

| CN | 101277541 A | 10/2008 |
|---|---|---|
| CN | 10135561 A | 1/2009 |

(Continued)

OTHER PUBLICATIONS

ETSI TS 129 513 V15.6.0 (Jan. 2020): 5G; 5G System; Policy and Charging Control signaling flows and QoS parameter mapping; Stage 3, teaches a query of a unified data repository, UDR, as claimed in Figure 5.1.1-1 step 2. (Year: 2020).*

(Continued)

*Primary Examiner* — Ronald Eisner
(74) *Attorney, Agent, or Firm* — Jenkins, Wilson, Taylor & Hunt, P.A.

(57) ABSTRACT

Methods, systems, and computer readable media for validating a session management function (SMF) registration request are disclosed. One method occurs at a network node. The method comprises: receiving, from a first SMF in a home network, a registration request indicating a first network identifier identifying a visited network where a user device is roaming; determining whether the registration request is valid by comparing the first network identifier and a second network identifier associated with an access and mobility management function (AMF) serving the user device; and performing at least one action based on the determining.

20 Claims, 5 Drawing Sheets

(56) References Cited

U.S. PATENT DOCUMENTS

| | | |
|---|---|---|
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,168,413 B2 | 1/2019 | Annamalai et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |

(56) References Cited

U.S. PATENT DOCUMENTS

| | | |
|---|---|---|
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1* | 7/2020 | Yan ................ H04M 15/66 |
| 2020/0259896 A1 | 8/2020 | Sachs et al. |
| 2020/0329363 A1 | 10/2020 | Mehta |
| 2020/0344604 A1* | 10/2020 | He ................ H04W 12/088 |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1* | 6/2021 | Stojanovski ........ H04W 60/00 |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1* | 9/2021 | Sun ................ H04W 48/18 |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124079 A1 | 4/2022 | Patil et al. |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0264260 A1 | 8/2022 | Chaurasia et al. |
| 2022/0272541 A1 | 8/2022 | Rajput et al. |

FOREIGN PATENT DOCUMENTS

| | | | |
|---|---|---|---|
| CN | 101742445 A | 6/2010 | |
| CN | 101917698 A | 12/2010 | |
| CN | 102656845 A | 9/2012 | |
| CN | 103179504 A | 6/2013 | |
| CN | 103444212 A | 12/2013 | |
| CN | 107800664 A | 3/2018 | |
| CN | 110035433 A * | 7/2019 | ............ H04L 9/085 |
| CN | 110800322 B | 5/2021 | |
| CN | ZL201880040478.3 | 4/2022 | |
| CN | ZL202080007649.X | 9/2022 | |
| EP | 1 067 492 A2 | 1/2001 | |
| EP | 1 906 682 A1 | 4/2008 | |
| EP | 2 204 955 A1 | 7/2010 | |
| EP | 2 785 125 B1 | 8/2018 | |
| EP | 3 493 569 A1 | 6/2019 | |
| EP | 3 646 630 B1 | 8/2021 | |
| EP | 3 662 630 | 8/2021 | |
| EP | 3954146 A1 | 2/2022 | |
| EP | 3 821 630 B1 | 7/2022 | |
| ES | 2 548 005 T3 | 10/2015 | |
| GB | 2503973 A | 1/2014 | |
| IN | 401247 | 7/2022 | |
| JP | 2008-053808 A | 3/2008 | |
| JP | 7038148 B2 | 3/2022 | |
| JP | 7113147 | 7/2022 | |
| JP | 7113147 B | 8/2022 | |
| JP | 7133010 | 8/2022 | |
| JP | 7133010 B2 | 9/2022 | |
| KR | 20180069737 A | 6/2018 | |
| WO | WO 2001/088790 A1 | 11/2001 | |
| WO | WO 2005/091656 A1 | 9/2005 | |
| WO | WO 2005/101872 A1 | 10/2005 | |
| WO | WO 2007/084503 A2 | 7/2007 | |
| WO | WO 2008/053808 A1 | 5/2008 | |
| WO | WO-2010/021886 A1 | 2/2010 | |
| WO | WO 2010/045646 A2 | 4/2010 | |
| WO | WO 2010/105099 A2 | 9/2010 | |
| WO | WO 2011/010640 A1 | 1/2011 | |
| WO | WO 2011/047382 A2 | 4/2011 | |
| WO | WO 2016/201990 A1 | 12/2016 | |
| WO | WO 2017/082532 A1 | 5/2017 | |
| WO | WO 2018/202284 A1 | 11/2018 | |
| WO | WO 2019/005287 A1 | 1/2019 | |
| WO | WO 2019/027813 A1 | 2/2019 | |
| WO | WO 2019/224157 A1 | 11/2019 | |
| WO | WO 2020/013889 A1 | 1/2020 | |
| WO | WO 2020/033113 A1 | 2/2020 | |
| WO | WO-2020036883 A1 * | 2/2020 | ............ H04W 60/00 |
| WO | WO 2020/164763 A1 | 8/2020 | |
| WO | WO 2020/174121 A1 | 9/2020 | |
| WO | WO 2020/179665 A1 | 9/2020 | |
| WO | WO 2020/210015 A1 | 10/2020 | |
| WO | WO 2020/257018 A1 | 12/2020 | |
| WO | WO 2021/138072 A1 | 7/2021 | |
| WO | WO 2022/015378 A1 | 1/2022 | |
| WO | WO 2022/046176 A1 | 3/2022 | |
| WO | WO 2022/066227 | 3/2022 | |
| WO | WO 2022/066228 A1 | 3/2022 | |
| WO | WO 2022/086596 A1 | 4/2022 | |
| WO | WO 2022/098404 A1 | 5/2022 | |
| WO | WO 2022/103454 A1 | 5/2022 | |
| WO | WO 2022/132315 A1 | 6/2022 | |
| WO | WO 2022/132316 A1 | 6/2022 | |
| WO | WO 2022/182448 A1 | 9/2022 | |

OTHER PUBLICATIONS

Commonly-Assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).

(56) References Cited

OTHER PUBLICATIONS

Communication under Rule 71(3) EPC Intention to grant for European Application Serial No. 18 756 018.0 (Feb. 24, 2021).
Commonly-Assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.
Communication of European publication number and information on the application of Article 67(3) EPC for European Application Serial No. 18756018.0 (May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
Dekok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.

Communication of European publication number and information on the application of Article 67(3) EPC for European Patent Application Serial No. 19730571.7 (Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71 (3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-Assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-Assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

(56) References Cited

OTHER PUBLICATIONS

Communication of European publication number and information on the application of Article 67(3) EPC for European Application Serial No. 18731923.1 (Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).
"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
Non-Final Office Action for U.S. Appl. No. 16/100,172 (dated Mar. 6, 2020).
Notice of Allowance and Fee(s) Due and Examiner-Initiated Interview Summary for U.S. Appl. No. 15/666,300 (dated Feb. 13, 2020).
Commonly-Assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Advisory Action and Applicant-Initiated Interview Summary for U.S. Appl. No. 16/100,172 (dated Dec. 20, 2019).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).
"FS.19 Diameter Interconnect Security," GSMA, pp. 1-3 (Dec. 20, 2019).
Notification of Transmittal of the International Search Report and the Written Opinion of the International Searching Authority, or the Declaration for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decision on Appeal for U.S. Appl. No. 13/047,287 (dated Jun. 18, 2019).
Notification of Transmittal of the International Search Report and the Written Opinion of the International Searching Authority, or the Declaration for International Patent Application No. PCT/US2019/018990 (dated May 8, 2019).
Commonly-Assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Sahu et al., "How 5G Registration Works," http://5gblogs.com/5g-registration/, 10 pages (Oct. 12, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).

(56) References Cited

OTHER PUBLICATIONS

"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stagel (3GPP TS 22.071 V11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).

Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron Centron GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Commonly-Assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-ld," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

(56) References Cited

OTHER PUBLICATIONS

Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Decision to grant a European patent pursuant to Article 97(1) EPC for European Patent Application Serial No. 18731923.1 (Jul. 15, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
Commonly-Assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-Assigned, co-pending U.S. Appl. No. 17/129,487 for "Methods, Systems, and Computer Readable Media for Ingress Message Rate Limiting," (Unpublished, filed Dec. 21, 2020).
Commonly-Assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-Assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-Assigned, co-pending U.S. Appl. No. 17/099,683 for "Methods, Systems, and Computer Readable Media for Validating Location Update Messages," (Unpublished, filed Nov. 16, 2020).
Commonly-Assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Dierks et al., "The Transport Layer Security (TLS) Protocol Version 1.2," RFC 5246, pp. 1-208 (Aug. 2008).
Housley et al., "Internet X.509 Public Key Infrastructure Certificate and Certificate Revocation List (CRL) Profile," RFC 3280, pp. 1-258 (Apr. 2002).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).

(56) References Cited

OTHER PUBLICATIONS

First Office Action for Japanese Application Serial No. 2021545918 (dated Mar. 8, 2022).
Non-Final Office Action for U.S. Appl. No. 17/129,487 (dated Mar. 21, 2022).
Decision to grant a European patent pursuant to Article 97(1) EPC for European Patent Application Serial No. 19710842.6 (Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
"KI#13, New Sol: Trigger Procedures for Request Analytics," China Telecom, SA WG2 Meeting #S2-139E, pp. 1-4 (Aug. 19-Sep. 2, 2020).
"5G; Procedures for the 5G System (3GPP TS 23.502 version 15.3.0 Release 15)," ETSI TS 123 502, V15.3.0, pp. 1-330 (Sep. 2018).
Non-Final Office Action for U.S. Appl. No. 17/009,683 (dated Jul. 15, 2022).
Decision to grant a European patent pursuant to Article 97(1) EPC for European Patent Application Serial No. 19710842.6 (Jun. 30, 2022).
Notice of Allowance for Chinese Application Serial No. 202080007649.X (dated Jun. 20, 2022).
Communication under Rule 71 (3) EPC Intention to Grant for European Patent Application Serial No. 19 749 059.2 (May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
Notification of reasons for refusal for Japanese Patent Application No. 2020-572898 (dated Oct. 25, 2022).
Final Office Action and Applicant-Initiated Interview Summary for U.S. Appl. No. 17/099,683 (dated Oct. 24, 2022).
Communication of European publication No. and information on the application of Article 67(3) EPC for European Patent Application No. 20842462.2 (Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Patent Application Serial No. 17/123,038 (dated Sep. 30, 2022).
Communication of European publication No. and information on the application of Article 67(3) EPC for European Patent Application Serial No. 20720580.8 (Jan. 19, 2022).
Non-Final Office Action for U.S. Patent Application Serial No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Applicant Initiated Interview Summary for U.S. Appl. No. 17/319,023 (dated Jan. 10, 2023).
Non-Final Office Action for U.S. Appl. No. 17/099,683 (dated Jan. 4, 2023).
Telekom, "N32 Message Anti-Spoofing within the SEPP", 3GPP TSG SA WG3 (Security) Meeting #91, S3-181480, pp. 1-2 (Apr. 2018).
Huawei, "New Annex for the SEPP in TR 33.926", 3GPP TSG-SA WG3 Meeting #95-BIS, S3-192180, pp. 1-5 (Jun. 2019).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71 (3) EPC Intention to Grant for European Patent Application Serial No. 20 720 580.8 (Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Non-Final Office Action for U.S. Appl. No. 17/123,038 (dated Sep. 30, 2022).

\* cited by examiner

US 11,622,255 B2

METHODS, SYSTEMS, AND COMPUTER READABLE MEDIA FOR VALIDATING A SESSION MANAGEMENT FUNCTION (SMF) REGISTRATION REQUEST

TECHNICAL FIELD

The subject matter described herein relates to methods and systems for preventing fraud related to communications networks. More particularly, the subject matter described herein relates to methods, systems, and computer readable media for validating a session management function (SMF) registration request.

BACKGROUND

Communications networks can be targeted by malicious actors for a variety of reasons, e.g., financial gain, espionage, or political aims. For example, vulnerabilities associated with "next generation" and current networks (e.g., a third generation partnership project (3GPP) fifth generation (5G) core network) allow some entities to commit revenue fraud, perform unauthorized data interceptions or data taps, and/or steal personal subscriber information. When such issues occur, many times an innocent party may be held responsible for rectifying and/or mitigating the damage. While network operators generally use security appliances, firewalls, and/or other devices to help prevent unauthorized access to their networks and customers, numerous issues can still exist within their networks due to the inherent security issues associated with protocols and/or procedures used in these networks.

SUMMARY

Methods, systems, and computer readable media for validating a session management function (SMF) registration request are disclosed. One method occurs at a network node. The method comprises: receiving, from a first SMF in a home network, a registration request indicating a first network identifier identifying a visited network where a user device is roaming; determining whether the registration request is valid by comparing the first network identifier and a second network identifier associated with an access and mobility management function (AMF) serving the user device; and performing at least one action based on the determining.

One system includes a network node. The network node includes at least one processor and memory. The network node is configured for receiving, from a first SMF in a home network, a registration request indicating a first network identifier identifying a visited network where a user device is roaming; determining whether the registration request is valid by comparing the first network identifier and a second network identifier associated with an AMF serving the user device; and performing at least one action based on the determining.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
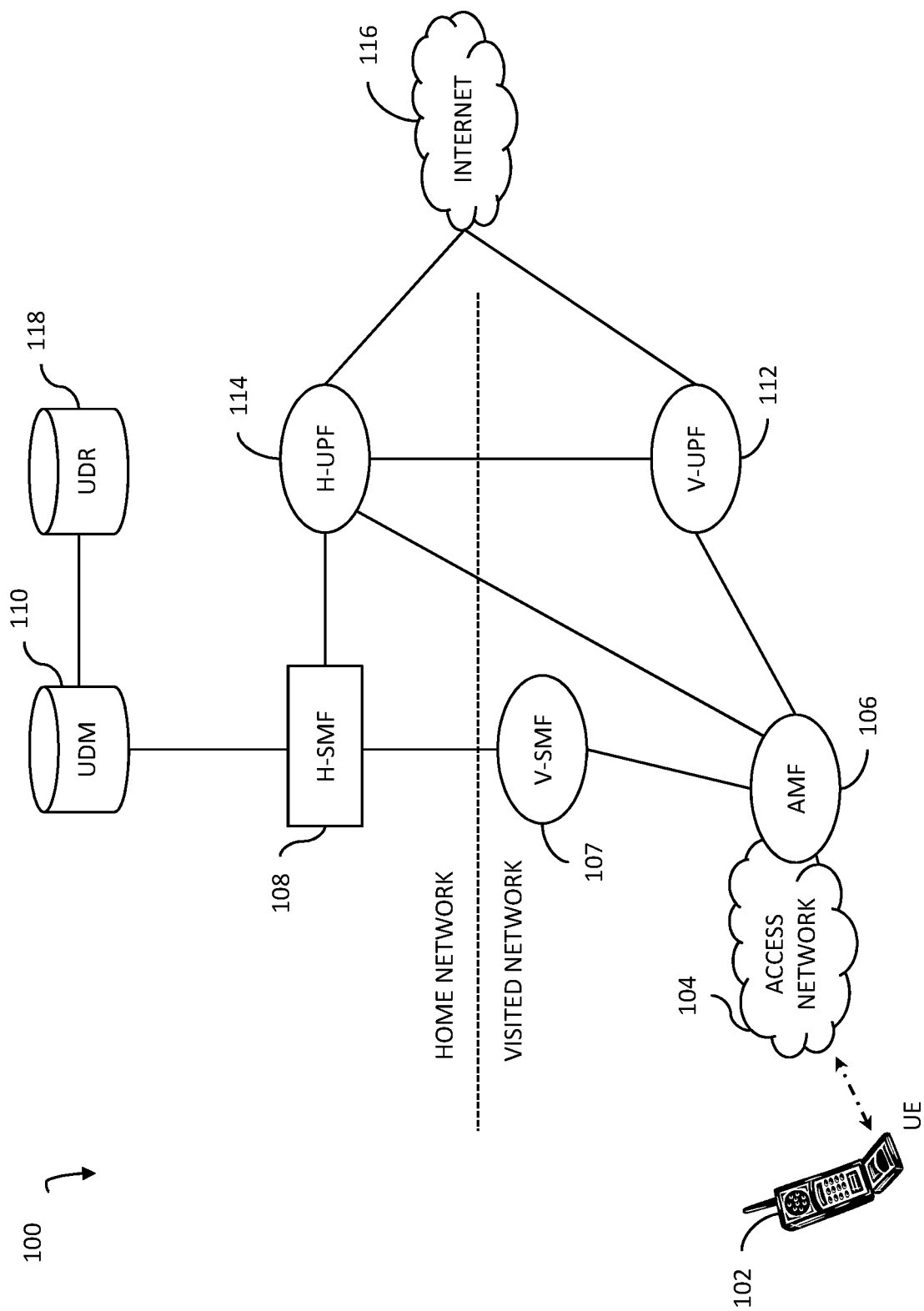
FIG. 1 is a diagram illustrating an example communications environment for validating a session management function (SMF) registration request.

The subject matter described herein relates to methods, systems, and computer readable media for validating a session management function (SMF) registration request. Vulnerabilities exist in various communications networks, including mobile communications networks. For example, a malicious network node (e.g., a malicious AMF or SMF) may be programmed or otherwise configured to generate and send a fraudulent session create request (e.g., a Nsmf_PDU_Session_Create message) to a home network of one or more subscribers. In this example, the fraudulent message may be for creating a protocol data unit (PDU) session and may include a subscriber and/or user device identifier (e.g., a subscription permanent identifier (SUPI) or an international mobile subscriber identity (IMSI)) and location information (e.g., a public land mobile network (PLMN) identifier) indicating that the subscriber is roaming in its network. In response to receiving this message, an SMF in the home network may generate and send a registration request (e.g., a Nudm_UECM_Registration message) to a unified data management (UDM) for registering itself as handling the PDU session. Since UDMs do not validate SMF registration requests, a home network or a node therein may act on fraudulent messages by completing the registration and providing the malicious network node with subscriber data (e.g., a subscriber profile) and/or other information which can be utilized to commit revenue fraud, perform data interception, steal subscriber profile details, and/or other malicious activities.

In accordance with some aspects of the subject matter described herein, techniques, methods, systems, or mechanisms are disclosed for validating an SMF registration request. For example, a network node (e.g., a UDM node) may use a registration validation algorithm for determining whether an SMF registration request is invalid, e.g., fraudulent, erroneous, inappropriate, etc. In some embodiments, the registration validation algorithm may involve comparing a first network identifier (e.g., a PLMN identifier of a visited network) located in the registration request and a second network identifier (e.g., a PLMN identifier) associated with an access and mobility management function (AMF) serving the user device. In some embodiments, if an SMF registration request is determined to be invalid or likely to be invalid (e.g., by determining that the first network identifier and the second network identifier do not match), the network node may perform one or more actions, such as discarding the message, averting a registration, notifying a network operator of potential malicious activities, or other mitigating actions.

Advantageously, by validating an SMF registration requests and performing one or more mitigating actions when an SMF registration request is determined to be invalid or likely to be invalid, malicious activities and their negative consequences (e.g., revenue fraud) can be avoided and/or prevented. It will be appreciated that various aspects of the subject matter described herein may be implemented in a 5G system network architecture or a network architecture that includes both 5G and non-5G network elements.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100 for validating an SMF registration request. FIG. 1 includes a UE 102 (e.g., a mobile device, a computer, a tablet computing platform, or a smartphone) capable of roaming or moving between different portions of a communications environment 100. In some embodiments, communications environment 100 may include one or more nodes associated with a fifth generation (5G) network with one or more entities having at least some functionality defined in one or more third generation partnership project (3GPP) technical specifications (TS), e.g., 3GPP TS 23.502 V16.6.0 (2020-09), 3GPP TS 23.501 V16.6.0 (2020-09), or 3GPP TS 29.502 V16.5.0 (2020-09).

Communications environment 100 may include a home network (e.g., a home public land mobile network (HPLMN)) and a visited network (e.g., a visited public land mobile network (VPLMN)). The home network may be associated with UE 102 and may be the UE's default network, while the visited network may be a network that UE 102 may use, may attempt to use, or may appear to use while roaming outside the home network's coverage area. In some embodiments, the home network and the visited network may include nodes for communicating with an external network, such as Internet 116.

In some embodiments, a home network and/or its related nodes may be configured to handle data services (e.g., Internet access or a PDU session), e.g., even when its subscribers are using a visited network for voice services. For example, a home network may handle data services for a roaming subscriber by routing a data flow service request through its network regardless of whether a visited network can provide the same services.

The visited network may include an access network 104, an AMF 106, a visited network SMF (V-SMF) 107, and a visited network user data plane function (V-UPF) 112. Access network 104 may represent a radio access network (e.g., a next-generation radio access network (NG-RAN)) and may include various nodes for communicating with UE 102 and elements within communications environment 100. Example nodes in access network 104 may include a next generation node B (gNB), a next generation evolved node B (ng-eNB), or other transceiver node, which may perform radio access functions. Access network 104, or nodes therein, may be used for communications between UE 102 and nodes in the visited network or communications environment 100, e.g., AMF 106. For example, a gNB or other node (e.g., a gateway) may communicate UE-related messages (e.g., authentication or mobility related messages) to AMF 106 or other nodes.

AMF 106 represents a node or gateway for facilitating communications between access network 104 and other nodes (e.g., V-UPF 112) or networks. In some embodiments, AMF 106 may communicate user traffic to other nodes in communications environment 100. In some embodiments, AMF 106 may also perform one or more mobility management functions, e.g., similar to those performed by a mobility management entity (MME) in 4G networks. In some embodiments, AMF 106 may forward session management requirements and/or related messages to V-SMF 107, e.g., via an N11 interface.

V-SMF 107 may represent any suitable entity or entities for performing one or more session management functions. For example, V-SMF 107 may interact with nodes in a decoupled data plane for creating, updating, and/or removing PDU sessions and/or for managing session contexts with V-UPF 112. In some embodiments, V-SMF 107 may communicate session related information to a home network SMF (H-SMF) 108 or other nodes in communications environment 100 for performing of facilitating various session management functions. For example, during a home-network routing scenario and after receiving a Nsmf_PDUSession_CreateSMContext request from AMF 106, V-SMF 107 may send a Nsmf_PDUSession_Create request to H-SMF 108 containing various information, e.g., a visited network PLMN identifier, a PDU session identifier, a UE identifier, and a V-SMF identifier. In this example, after storing an association between a PDU session identifier and V-SMF 107, H-SMF 108 may send a registration request (e.g., using a Nudm_UECM_Registration request) to UDM 110 for performing authentication and/or for registering itself as handling the PDU session.

V-UPF 112 may be any suitable entity for providing access to Internet 116 or other data networks, e.g., an Internet access point. In some embodiments, if AMF 106 may route IP traffic and/or related messages destined for Internet 116 via V-UPF 112 in the visited network. In some embodiments, e.g., if the home network is to handle data services for a roaming subscriber, AMF 106 may route IP traffic and/or related messages destined for Internet 116 via a home network user data plane function (H-UPF) 114 instead of via V-UPF 112.

The home network may include various nodes, e.g., H-SMF 108, a UDM 110, H-UPF 114, and a unified data repository (UDR) 118. In some embodiments, a home network may be configured as a subscribers default roaming provider. In some embodiments, a home network may be configured to allow a subscriber to change his roaming provider, e.g., for a certain or specified period of time.

H-SMF 108 may represent any suitable entity or entities for performing one or more session management functions. For example, H-SMF 108 may interact with nodes in a decoupled data plane for creating, updating, and/or removing PDU sessions and/or for managing session contexts with V-UPF 112. In some embodiments, H-SMF 108 may facilitate various session management functions associated with V-SMF 107, e.g., when UE 102 is roaming. For example, during a home-network routing scenario and after receiving a Nsmf_PDUSession_Create request from V-SMF 107, H-SMF 108 may store an association between a PDU session identifier and V-SMF 107 and then send a registration request (e.g., using a Nudm_UECM_Registration request) to UDM 110 for performing authentication and/or for registering itself as handling the PDU session.

H-UPF 114 may be any suitable entity for providing access to Internet 116 or other data networks, e.g., an Internet access point. In some embodiments, e.g., if the home network is handling data services for a roaming subscriber, AMF 106 may route IP traffic and/or related messages destined for Internet 116 via H-UPF 114 in the home network.

UDM 110 may represent any suitable entity or entities for managing user data, e.g., for access authorization, user registration, and/or data network profiles. In some embodiments, UDM 110 may include a stateful implementation where subscriber data is stored locally or may be a stateless or semi-stateless implementation where subscriber data is stored remotely, e.g., at UDR 118. In some embodiments, UDM 110 or related entity (e.g., UDR 118) may maintaining and/or providing one or more subscriber data management (SDM) or customer relationship management (CRM) functions. UDM 110 or related entity (e.g., UDR 118) may manage or provide subscriber-related information, such as user identification, control information for user authentication and authorization, UE location information, and user profile data. In some embodiments, UDM 110 may include or interact with an authentication server function (AUSF) that performs authentication services for UEs, such as UE 102.

UDR 118 may represent any suitable entity or entities for storing data for access authorization, user registration, and/or data network profile information. For example, UDR 118 may maintain or store subscriber-related information, such as user identification, control information for user authentication and authorization, UE location information, and user profile data. In this example, UDR 118 may include or utilize a database containing details about a subscriber identity module (SIM) card associated with UE 102, services available to UE 102, and the current location (e.g., current serving node) of UE 102.

In some embodiments, where UDM 110 or UDR 118 involves multiple nodes, each node may manage and/or maintain information for a portion of subscribers, e.g., hundreds of thousands to millions of subscribers and various nodes in communications environment 100 may be configured to identify and consult the appropriate node for information about a particular subscriber.

In some embodiments, UDM 110 may perform session and/or network registration procedures in response to receiving a registration request or other messages. For example, when UE 102 is roaming in a visited network, a registration request may be sent from H-SMF 108 in response to receiving a session create request from V-SMF 107.

In some embodiments, UDM 110 may include functionality for performing a validation analysis on a registration message, e.g., sent by H-SMF 108. For example, UDM 110 may be configured to analyze a header or payload portion of an SMF registration message and retrieve location information about a visited network (e.g., where UE 102 is roaming). In this example, UDM 110 may perform a validation analysis that includes executing one or more validation algorithms and/or rules for determining whether the SMF registration message or related information is valid or appears to be valid.

In some embodiments, a network identifier or related information may include any information usable for identifying a location of UE 102 or an associated subscriber. For example, a network identifier or related information may include a PLMN identifier, a mobile country code (MCC) a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGOI), location coordinates (e.g., global positioning system (GPS) information), and/or relative location information.

In some embodiments, a validation analysis or related algorithm may determine whether an SMF registration request is valid (or appears valid) by comparing a network identifier or related information indicated by the registration request as being where UE 102 is located and another network identifier or related information indicated by another source (e.g., UDR 118) as being where UE 102 is located. For example, determining that an SMF registration request is valid may involve confirming that the SMF registration request indicated the same visited network as a distinct or separate known reliable source (e.g., UDR 118).

For example, a validation analysis may involve comparing a first PLMN identifier indicated by or contained in an SMF registration request and a second PLMN identifier obtained by querying or accessing UDR 118. In this example, the second PLMN identifier may identify the network where AMF 106 is serving the same UE associated with the registration request, e.g., this information may be trusted and/or previously provided to UDR 118 by a trusted node or procedure. Continuing with this example, if the first network identifier and the second network identifier match (e.g., they identify the same network), then the validation analysis or related algorithm may determine that the SMF registration request is valid. However, if the first network identifier and the second network identifier do not match (e.g., they identify different networks), then the validation analysis or related algorithm may determine that the SMF registration request is invalid.

In some embodiments, UDM 110 may be configured to perform one or more actions based on a validation analysis or a related determination. For example, in response to determining that an SMF registration request is valid, UDM 110 may initiate or perform registration based on the registration request. In another example, in response to determining that an SMF registration request invalid, UDM 110 may screen, filter, or discard an SMF registration request or a related message, may avert a registration based on the registration request, may send a notification message to a management or security node indicating that the registration request is invalid, may send a notification message to a management or security node indicating that a related node is potentially malicious, or may copy or store a portion of the registration request.

It will be appreciated that FIG. 1 is for illustrative purposes and that various nodes and/or modules, locations, and/or functionality described above in relation to FIG. 1 may be changed, altered, added, or removed.

Figure 2:
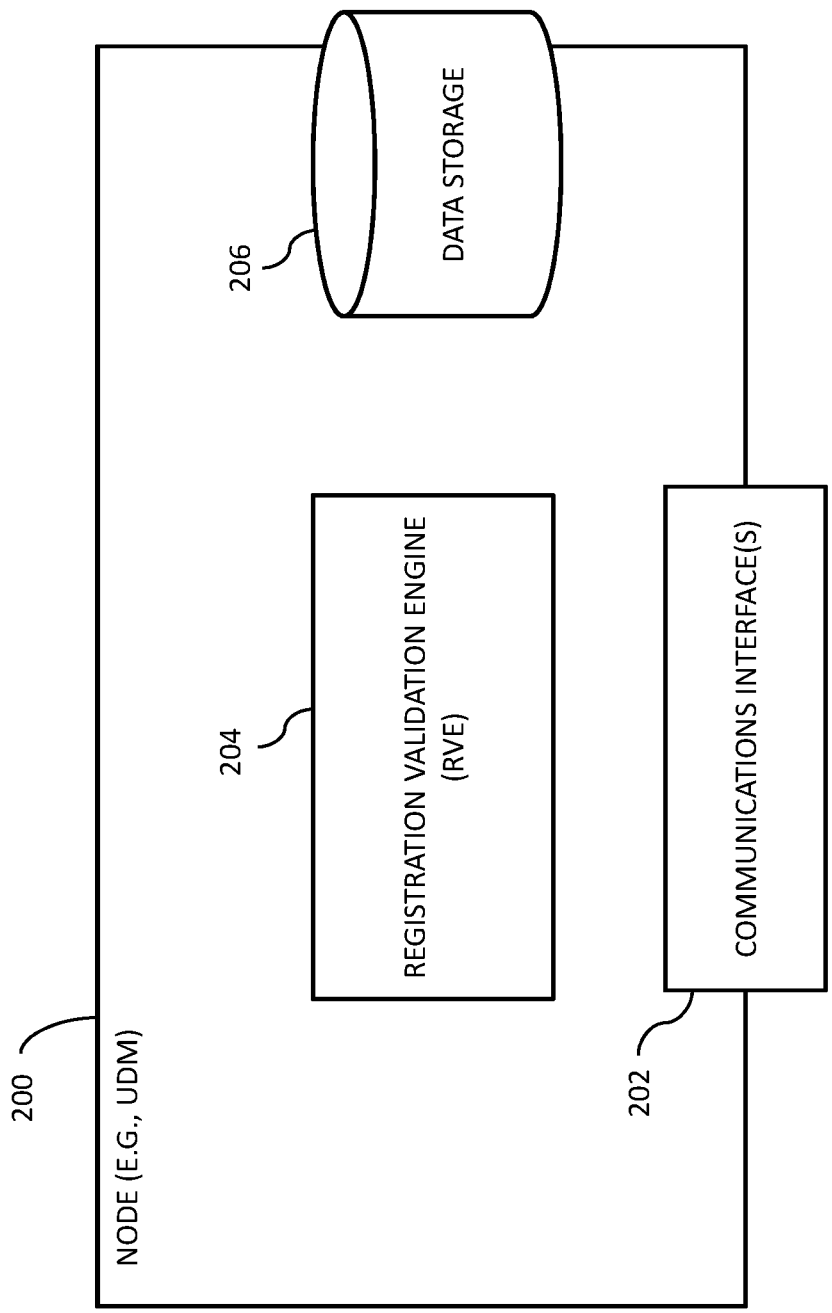
FIG. 2 is a diagram illustrating an example node for validating an SMF registration request.

FIG. 2 is a diagram illustrating an example node 200 for validating an SMF registration request. Node 200 may represent any suitable entity or entities for performing aspects of validating an SMF registration request. In some embodiments, node 200 may represent or include UDM 110, UDR 118, an AUSF, or another node or function.

Referring to FIG. 2, node 200 may include one or more communications interface(s) 202 for communicating messages via communications environment 100, e.g., a 5G core network. In some embodiments, communications interface(s) 202 may include a first communication interface for communicating with UDR 118 and a second communications interface for communicating with H-SMF 108.

Node 200 may include a registration validation engine (RVE) 204. RVE 204 may be any suitable entity (e.g., software executing on at least one processor) for performing one or more aspects of validating an SMF registration request. In some embodiments, RVE 204 may include functionality for identifying messages that contain subscriber location information, such as mobility management messages from roaming subscribers. For example, RVE 204 may identify relevant messages by filtering message based on header data and/or payload data.

In some embodiments, RVE 204 may include functionality for performing a validation analysis on a registration message, e.g., sent by H-SMF 108. For example, RVE 204 may be configured to analyze a header or payload portion of an SMF registration message and retrieve location information about a visited network (e.g., where UE 102 is roaming). In this example, RVE 204 may perform a validation analysis that includes executing one or more validation algorithms and/or rules for determining whether the SMF registration message or related information is valid or appears to be valid.

In some embodiments, a network identifier or related information may include any information usable for identifying a location of UE 102 or an associated subscriber. For example, a network identifier or related information may include a PLMN identifier, an MCC, an MNC, an LAC, a network identifier, a CGI, a BSID, an access node identifier, a CI, an SAC, an RAI, an RAC, a TAI, a TAC, an EGCI, location coordinates (e.g., GPS information), and/or relative location information.

In some embodiments, a validation analysis or related algorithm may determine whether an SMF registration request is valid (or appears valid) by comparing a network identifier or related information indicated by the registration request as being where UE 102 is located and another network identifier or related information indicated by another source (e.g., UDR 118) as being where UE 102 is located. For example, determining that an SMF registration request is valid may involve confirming that the SMF registration request indicated the same visited network as a distinct or separate known reliable source (e.g., UDR 118).

For example, a validation analysis may involve comparing a first PLMN identifier indicated by or contained in an SMF registration request and a second PLMN identifier obtained by querying or accessing UDR 118. In this example, the second PLMN identifier may identify the network where AMF 106 is serving the same UE associated with the registration request. Continuing with this example, if the first network identifier and the second network identifier match (e.g., they identify the same network), then the validation analysis or related algorithm may determine that the SMF registration request is valid. However, if the first network identifier and the second network identifier do not match (e.g., they identify different networks), then the validation analysis or related algorithm may determine that the SMF registration request is invalid.

In some embodiments, RVE 204 may be configured to perform one or more actions based on a validation analysis or a related determination. For example, in response to determining that an SMF registration request is valid, RVE 204 may perform or initiate registration based on the registration request. In another example, in response to determining that an SMF registration request invalid, RVE 204 may screen, filter, or discard an SMF registration request or a related message, may avert a registration based on the registration request, may send a notification message to a management or security node indicating that the registration request is invalid, may send a notification message to a management or security node indicating that a related node is potentially malicious, or may copy or store a portion of the registration request.

Node 200 may access (e.g., read from and/or write information to) data storage 206. Data storage 206 may be any suitable entity (e.g., a computer readable medium or memory) for storing various data. In some embodiments, data storage 206 may include registration related validation rules and/or policies. Data storage 206 may include information or logic for determining whether an SMF registration request is valid or invalid. Example information or logic usable in determining whether an SMF registration request is valid or invalid may include historical (e.g., prior) location information associated with a UE or a related node (e.g., AMF 106 or V-SMF 107) and/or logic to access or query one or more relevant databases or nodes, e.g., UDR 118, for obtaining various subscriber related information, e.g., an identifier for identifying the AMF currently serving a UE and/or an identifier for identifying a network associated with that AMF.

Data storage 206 may include UE related network information. For example, Data storage 206 may include mappings of PLMN identifiers, APNs, or other network identifiers and valid location information (e.g., MCC and/or MNCs). In some embodiments, a home network may store an approved access list of valid network identifiers or related information that roaming subscribers can use to receive data services or other services. In this example, node 200 or another node may access UE related network information to determine whether a registration request is associated with an appropriate network identifier. If the location information is associated with an appropriate network identifier in the approved access list, the registration request may be determined to be valid.

In some embodiments, a home network may store an blocked access list of invalid network identifiers or related information that roaming subscribers cannot use to receive data services or other services. In this example, node 200 or another node may access UE related network information to determine whether a registration request is associated with an inappropriate network identifier. If the location information is associated with a network identifier in the blocked access list, the registration request may be determined to be invalid.

It will be appreciated that FIG. 2 and its related description are for illustrative purposes and that node 200 may include additional and/or different modules, components, or functionality.

Figure 3:
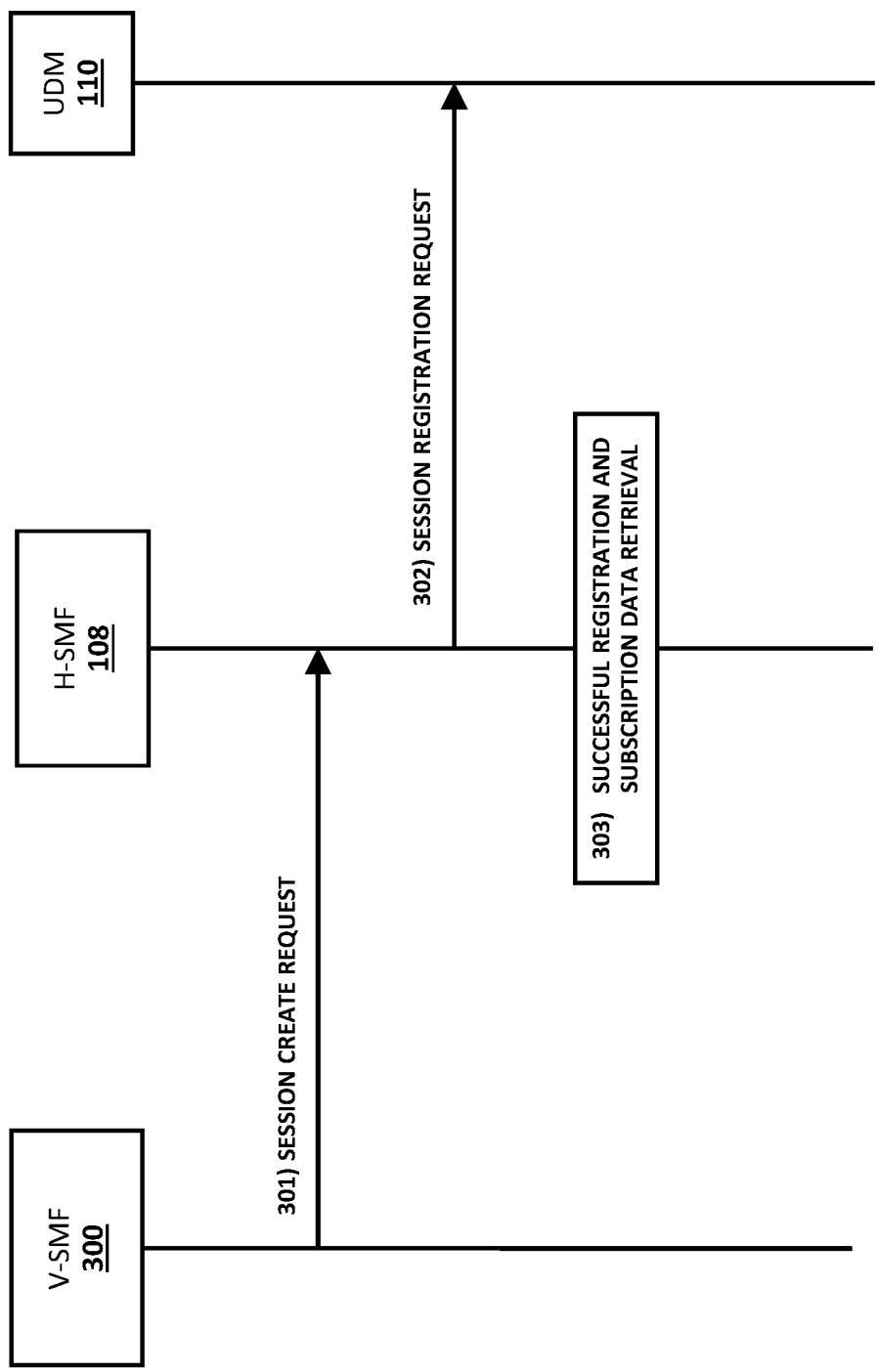
FIG. 3 is a diagram illustrating example messages associated with processing an SMF registration request.

FIG. 3 is a diagram illustrating example messages associated with processing an SMF registration request. In some embodiments, a session create request may be provided or initiated by a V-SMF 300, which may or may not be controlled by a malicious actor and/or used for malicious activities (e.g., revenue fraud and/or data interception). In some embodiments, V-SMF 300 may have or appear to have similar functionality as described above with regard to V-SMF 107.

Referring to FIG. 3, a portion of a PDU session creation procedure for a home routed roaming scenario is generally depicted. An example PDU session creation procedure for a home routed roaming scenario is defined in Section 4.3.2.2.2 of 3GPP TS 23.502 V16.6.0 (2020-09).

In step 301, a potentially fraudulent session create request (e.g., a Nsmf_PDU_Session_Create message) may be sent from V-SMF 300 to H-SMF 108. In some embodiments, the session create request may include a visited network PLMN identifier, a PDU session identifier, a UE identifier, and/or a V-SMF identifier.

In step 302, a registration request (e.g., a Nudm_UECM_Registration request) may be sent from H-SMF 108 to UDM 110. For example, after receiving a session create request from V-SMF 300, H-SMF 108 may store an association between a PDU session identifier and V-SMF 300 and may then send a registration request (e.g., using a Nudm_UECM_Registration request) to UDM 110 for registering itself as handling the PDU session.

In step 303, a successful registration and subscription data retrieval may occur. For example, a successful registration may occur when a success response to the registration request is received by H-SMF 108. In this example, V-SMF 300 may be capable of obtaining subscription data from UDM 110 or UDR 118 via H-SMF 108.

As shown, a potential security risk is evident in the message flow of FIG. 3. For example, when H-SMF 108 registers itself with UDM 110 for a given PDU session identifier associated with roaming UE 102, H-SMF 108 does not check with UDM 110 to confirm that the AMF that has triggered the registration request (e.g., by sending a Nsmf_PDUSession_CreateSMContext Request to V-SMF 300 which triggered V-SMF 300 to send a Nsmf_PDU_Session_Create message which in turn triggered H-SMF 108 to send the Nudm_UECM_Registration request) is registered for that UE with UDM. Further, UDM 110 allows successful SMF registration even if AMF 106 has not performed access registration using a UECM registration procedure. As such, since UDM 110 does not validate an SMF registration request, an attacker could send a fake Nsmf_PDUSession_Create Request to H-SMF 108, thus registering themselves with UDM 110.

It will be appreciated that FIG. 3 is for illustrative purposes and that different and/or additional messages and/or actions may be used. It will also be appreciated that various messages and/or actions described herein may occur in a different order or sequence.

Figure 4:
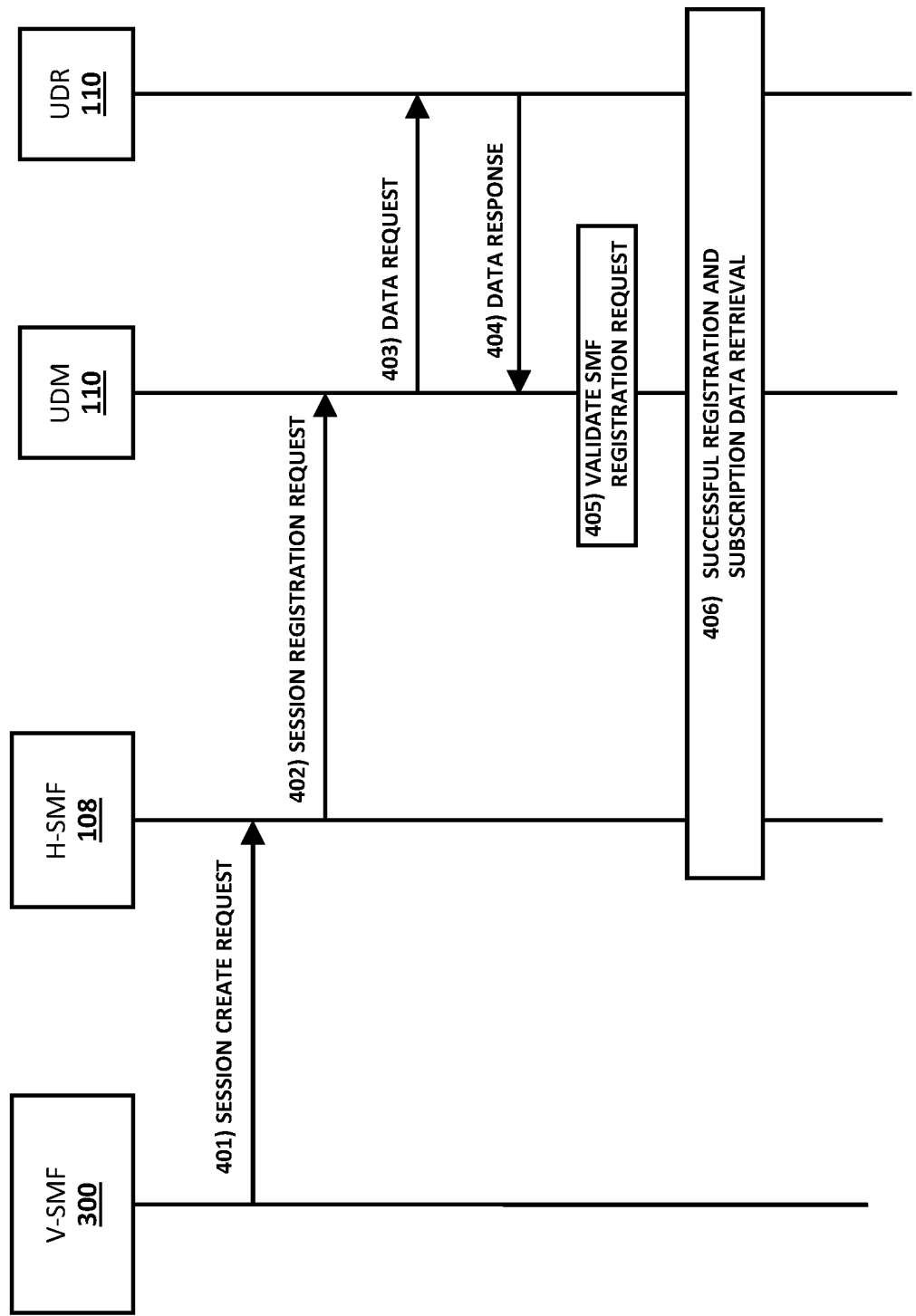
FIG. 4 is a diagram illustrating example messages associated with validating an SMF registration request.

FIG. 4 is a diagram illustrating example messages associated with validating an SMF registration request. In some embodiments, a session create request may be provided or initiated by a V-SMF 300, which may or may not be controlled by a malicious actor and/or used for malicious activities (e.g., revenue fraud and/or data interception). In some embodiments, V-SMF 300 may have or appear to have similar functionality as described above with regard to V-SMF 107.

In some embodiment, UDM 110 may determine whether a received SMF registration request is valid and may perform various actions based on this determination. In some embodiments, UDM 110 may include RVE 204 and be configured to analyze SMF registration requests.

Referring to FIG. 4, a portion of a PDU session creation procedure for a home routed roaming scenario with SMF registration request validation is generally depicted.

In step 401, a potentially fraudulent session create request (e.g., a Nsmf_PDU_Session_Create message) may be sent from V-SMF 300 to H-SMF 108. In some embodiments, the session create request may include a visited network PLMN identifier, a PDU session identifier, a UE identifier, and/or a V-SMF identifier.

In step 402, a registration request (e.g., a Nudm_UECM_Registration request) may be sent from H-SMF 108 to UDM 110. For example, after receiving a session create request from V-SMF 300, H-SMF 108 may store an association between a PDU session identifier and V-SMF 300 and may then send a registration request (e.g., using a Nudm_UECM_Registration request) to UDM 110 for registering itself as handling the PDU session.

In some embodiments, e.g., after UDM 110 receives a registration request from H-SMF 108, UDM 110 may validate a registration request by verifying that an AMF registered as serving a given UE has a same network identifier (e.g., PLMN identifier) as that of a requesting or trigger V-SMF 300. In such embodiments, a network identifier associated with the AMF registered as serving a given UE may be received in Amf3GppAccessRegistration data from UDR 118, e.g., using a GET request. If the PLMN identifiers match, then UDM 110 may proceed with processing the registration request. However, if PLMN identifiers do not match, then UDM 110 may perform one or more mitigating actions may be performed, e.g., do not proceed with processing the registration request.

In step 403, a data request may be sent from UDM 110 to UDR 118 for requesting a network identifier associated with an AMF serving a UE that corresponds to the registration request.

In step 404, a data response may be sent from UDR 118 to UDM 110 for providing the requested network identifier associated with an AMF serving a UE that corresponds to the registration request.

In step 405, UDM 110 may validate the registration request by verifying that the network identifier obtained from the UDR 118 matches the network identifier indicated by the registration request.

In step 406, if a registration request is determined to be valid, a successful registration and subscription data retrieval may occur. For example, a successful registration may occur when a success response to the registration request is received by H-SMF 108. In this example, V-SMF 300 may be capable of obtaining subscription data from UDM 110 or UDR 118 via H-SMF 108.

It will be appreciated that FIG. 4 is for illustrative purposes and that different and/or additional messages and/or actions may be used. It will also be appreciated that various messages and/or actions described herein may occur in a different order or sequence.

Figure 5:
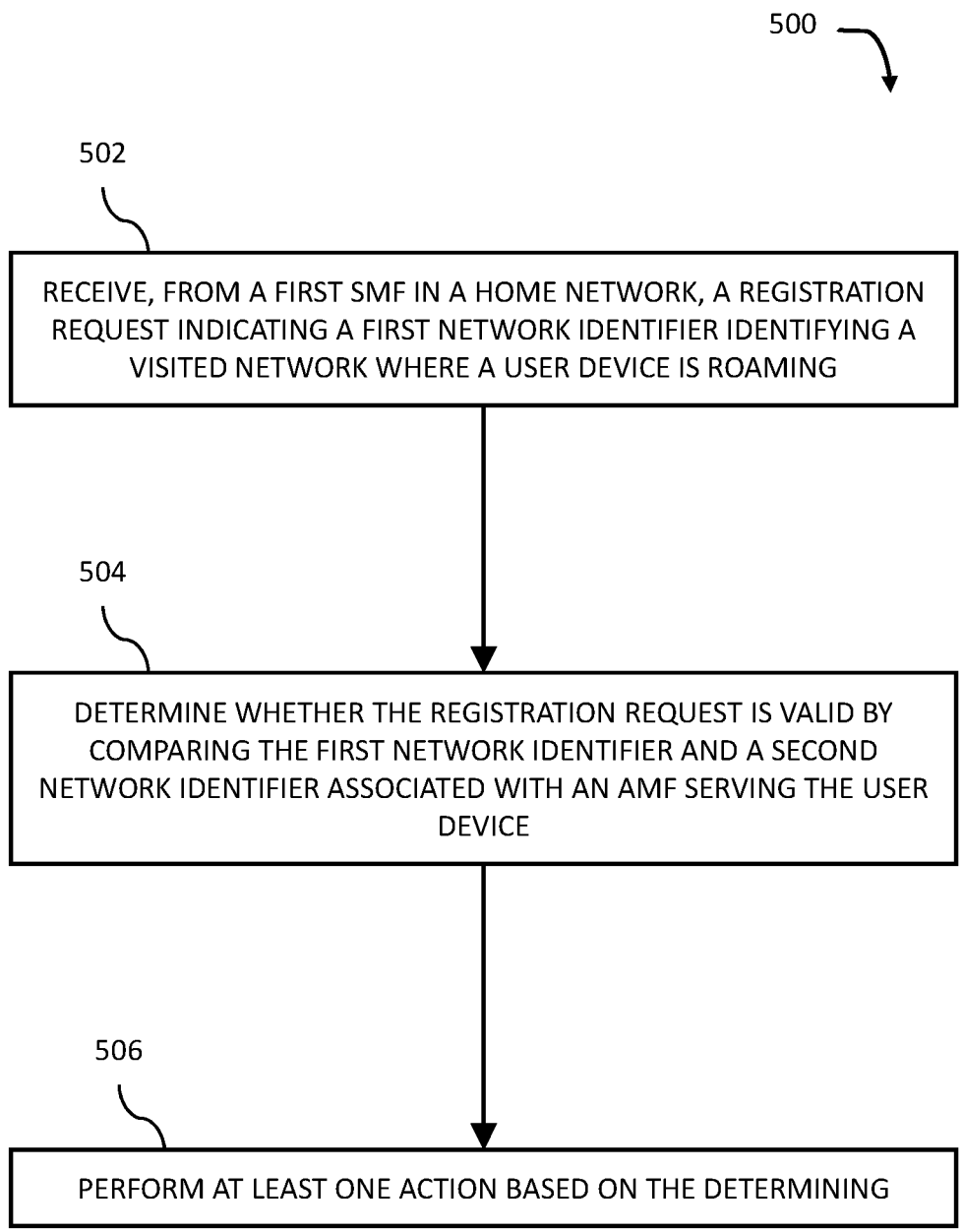
FIG. 5 is a diagram illustrating an example process for validating an SMF registration request.

FIG. 5 is a diagram illustrating an example process 500 for validating an SMF registration request. In some embodiments, example process 500 described herein, or portions thereof, may be performed at or performed by UDM 110, node 200, RVE 204, and/or another module or node.

Referring to example process 500, in step 502, a registration request indicating a first network identifier identifying a visited network where a user device is roaming may be received from a first SMF in a home network.

In some embodiments, a registration request may include a Nudm_UECM_Registration request.

In step 504, it may be determined whether the registration request is valid by comparing the first network identifier and a second network identifier associated with an AMF serving the user device.

In some embodiments, a second network identifier may be included in Amf3GppAccessRegistration data obtained from UDR 118.

In some embodiments, determining that a second SMF or a registration request is valid may include determining that a first network identifier and a second network identifier match.

In some embodiments, determining that a registration request is invalid may include determining that a first network identifier and a second network identifier do not match.

In step 506, at least one action may be performed based on the determining. For example, if location information is determined to be invalid, one or more mitigating actions may be performed, e.g., to prevent or minimize malicious activities.

In some embodiments, performing at least one action based on a registration related validation determination may include in response to determining that a registration request is valid, performing a registration based on the registration request.

In some embodiments, performing at least one action based on a registration related validation determination may include in response to determining that a registration request is invalid, discarding the registration request, averting a registration based on the registration request, sending a notification message to a management or security node indicating that the registration request is invalid, sending a notification message to a management or security node indicating that a related node is potentially malicious, or copying or storing a portion of the registration request.

In some embodiments, a first network identifier or a second network identifier may include a PLMN identifier or a PLMN code.

In some embodiments, a network node may include wherein the network node includes a UDM node, an AUSF, or a UDR.

It will be appreciated that process 500 is for illustrative purposes and that different and/or additional actions may be used. It will also be appreciated that various actions described herein may occur in a different order or sequence.

It will appreciated that while some aspects of the subject matter described herein has been discussed with reference to 5G networks various other networks may utilize some aspects of the subject matter described herein. For example, any network that utilize registration requests and/or includes a UDM-like and/or UDR-like node may use features, mechanisms and techniques described herein to validate (e.g., screen or filter) registration requests.

It should be noted that UDM 110, node 200, RVE 204, and/or functionality described herein may constitute a special purpose computing device. Further, UDM 110, node 200, RVE 204, and/or functionality described herein can improve the technological field of network security and/or fraud prevention. For example, by validating an SMF registration request and performing one or more mitigating actions when an SMF registration request is determined to be invalid or likely to be invalid, malicious activities and their negative consequences (e.g., revenue fraud) can be mitigated and/or prevented.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 23.501; $3^{rd}$ Generation Partnership Project; Technical Specification Group Services and System Aspects; System architecture for the 5G System (5GS); Stage 2 (Release 16) V16.6.0 (2020-09)
2. 3GPP TS 23.502; $3^{rd}$ Generation Partnership Project; Technical Specification Group Services and System Aspects; Procedures for the 5G System (5GS); Stage 2 (Release 16) (2020-03) V16.6.0 (2020-09)
3. 3GPP TS 29.502, Technical Specification Group Core Network and Terminals; 5G System, Session Management Services, Stage 3, (Release 16) V16.5.0 (2020-09)

It will be understood that various details of the subject matter described herein may be changed without departing from the scope of the subject matter described herein. Furthermore, the foregoing description is for the purpose of illustration only, and not for the purpose of limitation.

What is claimed is:

1. A method for validating a session management function (SMF) registration request, the method comprising:
at a network node:
receiving, from a first session management function (SMF), the first SMF being located in a home network, a registration request indicating a first network identifier identifying a visited network where a user device is roaming;
after receiving the registration request, querying a unified data repository (UDR) for a second network identifier;
receiving, from the UDR, as a response to the querying, the second network identifier identifying a network where an access and mobility management function (AMF) is registered as serving the user device;
determining whether the registration request is valid by comparing the first network identifier and the second network identifier; and
performing at least one action based on the determining.

2. The method of claim 1 wherein the second network identifier is included in Amf3GppAccessRegistration data obtained from the UDR.

3. The method of claim 1 wherein determining that the registration request is valid includes determining that the first network identifier and the second network identifier match.

4. The method of claim 1 where determining that the registration request is invalid includes determining that the first network identifier and the second network identifier do not match.

5. The method of claim 1 wherein performing the at least one action includes in response to determining that the registration request is valid, performing a registration based on the registration request.

6. The method of claim 1 wherein performing the at least one action includes in response to determining that the registration request is invalid, discarding the registration request, averting a registration based on the registration request, sending a notification message to a management or security node indicating that the registration request is invalid, sending a notification message to a management or security node indicating that a related node is potentially malicious, or copying or storing a portion of the registration request.

7. The method of claim 1 wherein the first network identifier or the second network identifier includes a public land mobile network (PLMN) identifier or a PLMN code.

8. The method of claim 1 wherein the registration request includes a Nudm_UECM_Registration request.

9. The method of claim 1 wherein the network node includes a unified data management (UDM) node, an authentication server function (AUSF), or the UDR.

10. A system for validating a session management function (SMF) registration request, the system comprising:
a network node comprising:
at least one processor; and
a memory,
wherein the network node is configured for:
receiving, from a first session management function (SMF), the first SMF being located in a home network, a registration request indicating a first network identifier identifying a visited network where a user device is roaming;
after receiving the registration request, querying a unified data repository (UDR) for a second network identifier;
receiving, from the UDR, as a response to the querying, the second network identifier identifying a network where an access and mobility management function (AMF) is registered as serving the user device;
determining whether the registration request is valid by comparing the first network identifier and the second network identifier; and
performing at least one action based on the determining.

11. The system of claim 10 wherein the second network identifier is included in Amf3GppAccessRegistration data obtained from the UDR.

12. The system of claim 10 wherein the network node is configured for determining that the registration request is valid by determining that the first network identifier and the second network identifier match.

13. The system of claim 10 wherein the network node is configured for determining that the registration request is invalid by determining that the first network identifier and the second network identifier do not match.

14. The system of claim 10 wherein the network node is configured for:
in response to determining that the registration request is valid, performing a registration based on the registration request.

15. The system of claim 10 wherein the network node is configured for:
in response to determining that the registration request is invalid, discarding the registration request, averting a registration based on the registration request, sending a notification message to a management or security node indicating that the registration request is invalid, sending a notification message to a management or security node indicating that a related node is potentially malicious, or copying or storing a portion of the registration request.

16. The system of claim 10 wherein the first network identifier or the second network identifier includes a public land mobile network (PLMN) identifier or a PLMN code.

17. The system of claim 10 wherein the registration request includes a Nudm_UECM_Registration request.

18. The system of claim 10 wherein the network node includes a unified data management (UDM) node, an authentication server function (AUSF), or the UDR.

19. A non-transitory computer readable medium comprising computer executable instructions embodied in the non-transitory computer readable medium that when executed by at least one processor of at least one computer cause the at least one computer to perform steps comprising:
at a network node:
receiving, from a first session management function (SMF), the first SMF being located in a home network, a registration request indicating a first network identifier identifying a visited network where a user device is roaming;
after receiving the registration request, querying a unified data repository (UDR) for a second network identifier;
receiving, from the UDR, as a response to the querying, the second network identifier identifying a network where an access and mobility management function (AMF) is registered as serving the user device;
determining whether the registration request is valid by comparing the first network identifier and the second network identifier; and
performing at least one action based on the determining.

20. The non-transitory computer readable medium of claim 19 wherein the second network identifier is included in Amf3GppAccessRegistration data obtained from the UDR.

* * * * *